United States Patent [19]

Katsura

[11] 4,255,490

[45] Mar. 10, 1981

[54] OLEFIN-VINYL ALCOHOL-VINYL ACETAL COPOLYMERS, PROCESS FOR PREPARATION THEREOF AND LAMINATE STRUCTURES INCLUDING SAID COPOLYMERS

[75] Inventor: Tadahiko Katsura, Yokohama, Japan

[73] Assignee: Toyo Seikan Kaisha Limited, Tokyo, Japan

[21] Appl. No.: 901

[22] Filed: Jan. 4, 1979

Related U.S. Application Data

[62] Division of Ser. No. 854,007, Nov. 22, 1977.

[30] Foreign Application Priority Data

Nov. 25, 1976 [JP] Japan .............................. 51-140749
Nov. 25, 1976 [JP] Japan .............................. 51-140750

[51] Int. Cl.³ ...................... B32B 27/08; B32B 27/32; B32B 27/36; B32B 27/34
[52] U.S. Cl. ................................ 428/483; 428/475.8; 428/515; 428/516; 428/536; 525/60; 525/61
[58] Field of Search ............... 428/515, 516, 520, 483, 428/475.8, 526

[56] References Cited

U.S. PATENT DOCUMENTS

| | | | |
|---|---|---|---|
| 2,405,983 | 8/1946 | Sharkey et al. ......................... | 526/k9 |
| 2,636,803 | 4/1953 | Cline et al. .............................. | 526/9 |
| 3,080,207 | 3/1965 | Tanabe et al. ........................... | 526/9 |
| 3,540,962 | 11/1970 | Anzawa et al. ....................... | 428/520 |
| 3,817,821 | 6/1974 | Gallini ................................... | 428/516 |
| 3,925,591 | 12/1975 | Breitenfellner ....................... | 428/520 |
| 4,072,779 | 2/1978 | Knox et al. ........................... | 428/430 |

FOREIGN PATENT DOCUMENTS

| | | | |
|---|---|---|---|
| 49-8950 | 3/1974 | Japan ..................................... | 428/516 |
| 50-34682 | 4/1975 | Japan ..................................... | 428/516 |
| 831931 | 4/1960 | United Kingdom ..................... | 428/483 |
| 1212569 | 11/1970 | United Kingdom ..................... | 428/516 |
| 1436362 | 5/1976 | United Kingdom ................... | 428/475.8 |

*Primary Examiner*—Joseph L. Schofer
*Assistant Examiner*—Herbert J. Lilling
*Attorney, Agent, or Firm*—Diller, Ramik & Wight

[57] ABSTRACT

A copolymer comprising 10 to 50 mole % of olefin units and 90 to 50 mole % of vinyl units, 50 to 98 mole % of the vinyl units being vinyl alcohol units and 2 to 50 mole % of the vinyl units being vinyl acetal units, is disclosed. This copolymer has excellent resistance to hot water and excellent oxygen barrier property in combination. When this copolymer is subjected to retortsterilization, blanching is not caused and the excellent oxygen barrier property can be maintained. When this copolymer is laminated on a polyolefin or the like a laminate structure excellent in the interlaminar peel strength is provided.

11 Claims, 4 Drawing Figures

OLEFIN-VINYL ALCOHOL-VINYL ACETAL COPOLYMERS, PROCESS FOR PREPARATION THEREOF AND LAMINATE STRUCTURES INCLUDING SAID COPOLYMERS

This is a division of application Ser. No. 854,007 filed Nov. 22, 1977.

BACKGROUND OF THE INVENTION (1) Field of the Invention

This invention relates to an olefin-vinyl alcohol-vinyl acetal copolymer having excellent resistance to hot water and excellent oxygen barrier property in combination and also to a process for the preparation thereof. Further, the invention relates to a packaging material composed of said olefin-vinyl alcohol-vinyl acetal copolymer. Still further, the invention relates to a laminate structure having excellent resistance to hot water, excellent oxygen barrier property and high interlaminar peel strength in combination and more particularly, the invention concerns a laminate structure including a layer consisting of a novel olefin-vinyl alcohol-vinyl acetal copolymer.

(2) Description of the Prior Art

Ethylene-vinyl alcohols are ordinarily prepared by saponifying an ethylene-vinyl acetate copolymer. Accordingly, they are called "saponified ethylene-vinyl acetate copolymers". These saponified copolymers are broadly used as packaging materials for foods and medicines, especially for formation of packaging vessels. Properties of such saponified ethylene-vinyl acetate copolymers are changed depending on the ethylene content, the degree of saponfication, the intrinsic viscosity and other factors, but they are excellent in the oxygen gas barrier property, the flavor-retaining property, the oil resistance and the transparency irrespective of these factors. Accordingly, when a film or other shaped article composed of such saponified copolymer is used as a structural material of a packaging vessel or as an oxygen barrier layer of a laminate material for production of a multi-layer vessel, decomposition or discoloration of the content by oxygen can be prevented and also deterioration of the taste or flavor or dispersion of the flavor can be prevented. Still further, bleeding of an oil or the like in the content to the surface of the vessel is not caused. Accordingly, various advantages are attained by the use of such saponified copolymers.

However, saponified ethylene-vinyl acetate copolymers are poor in the resistance to polar solvents such as water, and when they are exposed to hot water or steam as in the case of hot water sterilization or retort sterilization (heating sterilization under pressure) of foods, the mechanical strength is drastically reduced and such undesirable phenomena as deformation and adhesion are caused in films or vessels comprising these saponified copolymers, resulting in occurrence of such defects as blanching, wrinkling, contraction and interlaminar peeling. These defects are also observed even when such saponified ethylene-vinyl acetate copolymer is used as an intermediate layer of a multi-layer laminate structure including at least three layers so as to prevent direct contact of the copolymer with hot water or steam. Recently, in order to retain the flavor, color and texture of a packaged food after sterilization, there has been developed a so-called high-temperature short-time sterilization process (HTST process) in which sterilization is conducted under heating for a short time at a temperature higher than 130° C. Under such high-temperature retort sterilization conditions, even dissolution of saponified ethylene-vinyl acetate copolymers is observed. Even sterilization using hot water maintained at a temperature of 80° C. or higher is difficult in case of a film or vessel composed of a saponified ethylene-vinyl acetate copolymer and even when the saponified copolymer is used as an intermediate layer of a multi-layer laminate structure defects such as blanching and wrinkling are caused under such high temperature conditions as adopted in retort sterilization and therefore, such laminate structure cannot practically be applied to the use where sterilization is required.

Accordingly, at the present, the application field of saponified ethylene-vinyl acetate copolymer is limited in the range where sterilization is not required, though they have various merits and advantages as packaging materials.

Various proposals have heretofore been made to improve the resistance to hot water in saponified ethylene-vinyl acetate copolymers. Among these proposals, a method comprising laminating an olefinic resin on both the surfaces of a film of a saponified ethylene-vinyl acetate copolymer: is most frequently adopted in the art. A laminate structure obtained according to this method has a resistance to water of a relatively low temperature, but it cannot resist the above-mentioned high-temperature sterilization using hot water of a high temperature or steam.

Also various proposals have heretofore been made to improve the hot water resistance by treating saponified ethylene-vinyl acetate copolymer per se. For example, there can be mentioned a method comprising subjecting a film of the saponified copolymer to a treatment with hot water (see Japanese Patent Publication No. 13600/69), a method comprising dipping a film of the saponified copolymer in an aqueous solution containing sulfuric acid or hydrochloric acid and then subjecting the film to a treatment with hot water (see Japanese Patent Publication No. 114/71), a method comprising treating a shaped article of the saponified copolymer with a solution of an organic titanate (see Japanese Patent Publications No. 17071/71) and a method comprising treating a shaped article of the saponified copolymer with a solution comprising an alcohol, an organic carboxylic acid and an organic titanium compound (see Japanese Patent Publication No. 17915/71). However, according to these treatment methods, there are obtained only products which can resist the hot water treatment conducted at 100° C. at highest, and it is impossible to obtain products which can resist the hot water or steam treatment conducted at 120° C. or a higher temperature.

It has been known from old that when a film of a polyvinyl alcohol resin having an excellent oxygen gas barrier property is subjected to an acetalizing treatment using formaldehyde or the like, the hot water resistance of the film can be improved. However, when a film of such polyvinyl alcohol resin is acetalized to such an extent that the film can resist the retort sterilization conducted at a temperature higher than 120° C., the inherent oxygen gas barrier property of the film is drastically degraded and no excellent packaging material is obtained.

BRIEF SUMMARY OF THE INVENTION

I found that a novel olefin-vinyl alcohol-vinyl acetal copolymer comprising olefin units, vinyl alcohol units and vinyl acetal units in specific amounts has excellent oxygen barrier property and hot water resistance in combination and is valuable as a heat-sterilizable sealing packaging material.

It was also found that a laminate structure comprising the above novel copolymer and a heat-sealable resin has a most desirable combination of excellent oxygen barrier property, high resistance to hot water and high interlaminar peel strength and it can resist heat sterilization, especially heat sterilization conducted at a temperature higher than 130° C.

I have now completed the present invention based on these findings.

It is a primary object of the present invention to provide a novel olefinyl-vinyl alcohol-vinyl acetal copolymer having a high oxygen barrier property (oxygen impermeability) comparable to that of an olefin-vinyl alcohol copolymer, which can resist a hot water or hot steam treatment conducted at a temperature higher than 120° C. and also to provide a process for the preparation of the novel copolymer.

Another object of the present invention is to provide a novel packaging resinous material which can be subjected to hot water sterilization, retort sterilizaton, high-temperature short-time sterilization and the like treatments and which can preserve packaged foods for a long time even at room temperature.

Still another object of the present invention is to provide a laminate structure comprising a layer of a novel olefin-vinyl alcohol-vinyl acetal copolymer having a high oxygen barrier property (oxygen impermeability) comparable to that of an olefin-vinyl alcohol copolymer, which can resist a hot water or hot steam treatment conducted at a temperature higher than 120° C.

A further object of the present invention is to provide a novel heat-sealable packaging laminate structure which can be subjected to hot water sterilization, retort sterilization, high-temperature short-time sterilization and the like treatments and which can preserve packaged foods for a long time even at room temperature.

In accordance with the present invention, there is provided an olefin-vinyl alcohol-vinyl copolymer having excellent hot water resistance and excellent oxygen barrier property in combination, which consists essentially of 10 to 50 mole % of olefine units and 90 to 50 mole % of vinyl units, 50 to 98 mole % of the vinyl units being vinyl alcohol units and 2 to 50 mole % of the vinyl units being at least one kind of vinyl acetal units selected from the group consisting of (A) units represented by the following formula:

wherein $R_1$ stands for a hydrogen atom or a monovalent aliphatic, aromatic or aliphatic-aromatic group, (B) units represented by the following formula:

wherein $R_1$ is as defined above, (C) units represented by the following formula:

wherein $R_2$ stands for a direct bond or a divalent aliphatic, aromatic or aliphatic-aromatic group, and (D) units represented by the following formula:

wherein $R_2$ is as defined above.

In accordance with the present invention, there is also provided a laminate structure having excellent hot water resistance, excellent oxygen barrier property and high interlaminar peel strength in combination, which comprises (i) a layer composed of the above-mentioned novel olefin-vinyl alcohol-vinyl acetal copolymer and (ii) a layer composed of a heat-sealable resin.

BRIEF DESCRIPTION OF THE DRAWING

FIG. 3-(A) is a sectional view showing an example of a four-layer laminate structure of the present invention.

FIG. 3-(B) is a sectional view showing another examle of a four-layer laminate structure of the present invention.

DETAILED DESCRIPTION OF THE PREFERRED EMBODIMENTS COPOLYMER

In the novel copolymer of the present invention, in order to attain desirable combination of excellent oxygen gas barrier property and high hot water resistance, it is important that the content of olefin units should be 10 to 50 mole %, especially 20 to 40 mole %, and the content of vinyl units, namely the total content of vinyl alcohol units and vinyl acetal units, should be 90 to 50 mole %, especially 80 to 60 mole %. More specifically, if the content of the olefin units exceeds 50 mole % of the total units, the oxygen gas barrier property of the resulting copolymer is much lower than that of the copolymer included in the scope of the present invention, and the intended objects of the present invention cannot be attained by such copolymer. If the content of the ethylene units in the copolymer is lower than 10 mole %, the hydrophilic property of the copolymer is enhanced and it is very difficult to attain high hot water resistance and excellent oxygen gas barrier property in combination, however diversely the ratio of the vinyl alcohol units and vinyl acetal units, described hereinafter, may be changed.

In the novel copolymer of the present invention, in order to attain desirable combination of excellent oxygen gas barrier property and high hot water resistance, it is also important that 50 to 98 mole %, especially 70 to 95 mole %, of the vinyl units should be occupied by vinyl alcohol units and 2 to 5 mole %, especially 5 to 30 mole %, of the vinyl units should be occupied by at least one kind of vinyl acetal units represented by the above-mentioned formulae (A) to (D). As will readily be understood from experimental results shown in Comparative Examples 1, 2 and 5 given hereinafter, in case of a copolymer having a vinyl acetal unit content lower than 2 mole % of the total vinyl units, a satisfactory oxygen gas barrier property is attained, but a film composed of this copolymer is readily whitened when contacted with hot water maintained at 100° C. and the film tends to be dissolved when contacted with hot water maintained at 135° C. In contrast, as will be apparent from experimental data shown in Comparative Examples 3 and 4 given hereinafter, if the vinyl acetal unit content is higher than 50 mole % of the total vinyl units, a satisfactory hot water resistance can be attained, but the oxygen permeability becomes 50 times or higher and the mechanical properties of the film, such as the stress-rupture strength, are degraded. On the other hand, when the molar ratio of the vinyl alcohol units and vinyl acetal units is adjusted within the abovementioned range according to the present invention, the resistance to hot water maintained at a temperature higher than 100° C., especially higher than 130° C., can be remarkably improved while the oxygen impermeability and mechanical properties are maintained at the substantially same levels as those of ethylene-vinyl alcohol copolymers.

The above effect attained by the present invention is quite surprising. For example, as shown in Table 1 given hereinafter, the oxygen gas permeability of an ethylene-vinyl alcohol copolymer free of vinyl acetal units is only 1.2 cc/m² per 24 hours, whereas the oxygen gas permeability of a copolymer in which 56.4 mole % of the vinyl units of the above ethylene-vinyl alcohol copolymer are acetalized by glyoxal is as high as 52 cc/m² per 24 hours. Therefore, it is construed that the oxygen gas permeability of the above copolymer is enhanced with decrease of the content of the vinyl alcohol units. Accordingly, in a copolymer having 7.1 mole % of the vinyl alcohol units acetalized, it is presumed that the oxygen gas permeability may be equal to the arithmetic mean calculated from the above two values, namely 7.6 cc/m² per 24 hours. As is shown in Example 4 given hereinafter, however, the above copolymer of the present invention has an oxygen gas permeability of only 1.5 cc/m² per 24 hours, which value is less than 1/5 of the arithmetic mean. This fact is quite surprising and cannot be expected from the above presumption at all.

In the copolymer of the present invention, any of olefins represented by the following formula (A):

wherein $R_3$ stands for a hydrogen atom or an alkyl group having up to 4 carbon atoms, can be used. More specifically, there can be used ethylene, propylene, butene-1, pentene-1, 4-methylpentene-1 and the like. These olefins may be used singly or in the form of a mixture of two or more of them.

Ethylene is most preferred among these olefins. Of course, an olefin other than ethylene, for example, propylene, may be used in combination with ethylene in an amount of up to 15 mole %, especially up to 10 mole %, of ethylene units.

The presence of units derived from the above-mentioned olefin is indispensable for improving both the oxygen gas barrier property and hot water resistance simultaneously in the copolymer of the present invention. The intended improvement cannot be attained at all in a copolymer free of olefin units. More specifically, as will readily be understood from experimental results shown in Comparative Examples 6 and 7 given hereinafter, when a polyvinyl alcohol free of olefin units is acetalized within a range not causing substantial degradation of the oxygen gas barrier property (degree of acetalization = 22.3 mole %), the acetalized polymer is whitened or dissolved when contacted with hot water maintained at 100° C. and no satisfactory hot water resistance can be attained. On the other hand, when the polyvinyl alcohol is acetalized within a range providing a sufficient hot water resistance (degree of acetalization = 60.2 mole %), the oxygen permeability is abruptly enhanced to such a high level as 63.0 cc/m² per 24 hours.

Preparation of Copolymer

In general, the olefin-vinyl alcohol-vinyl acetal copolymer is prepared by a process comprising reacting an olefin-vinyl alcohol copolymer comprising 10 to 50 mole % of olefin units and 90 to 50 mole % of vinyl alcohol units with at least one member selected from the group consisting of monoaldehydes represented by the following formula (F):

$$R_1-CHO$$

wherein $R_1$ stands for a hydrogen atom or a monovalent aliphatic, aromatic or aliphatic-aromatic group, and dialdehydes represented by the following general formula (G):

$$OHC-R_2-CHO$$

wherein $R_2$ stands for a direct bend or a divalent aliphatic, aromatic or aliphatic-aromatic group, thereby to acetalize 2 to 50 mole % of hydroxyl groups in said olefin-vinyl alcohol copolymer.

As the starting olefin-vinyl alcohol copolymer, there can be used any of copolymers comprising units of at least one olefin selected from the above-mentioned olefins and units of vinyl alcohol. These olefin-vinyl alcohol copolymers are ordinarily prepared by saponifying a copolymer of an olefin such as ethylene with a vinyl ester such as vinyl acetate according to known means so that the degree of saponification is at least 90%, preferably at least 95%, especially preferably at least 98%.

The molecular weight of the olefin-vinyl alcohol copolymer that is used in the present invention is not particularly critical, so far as the copolymer has a film-forming molecular weight. In general, the viscosity of an olefin-vinyl alcohol copolymer is determined by using a mixed solvent comprising 85% by weight of phenol and 15% by weight of water. In order to attain the objects of the present invention, it is preferred to use an olefin-vinyl alcohol copolymer in which the intrinsic viscosity $[\eta]$ as measured at 30° C. in the above-mentioned mixed solvent is at least 0.05 l/g, especially in the range of from 0.07 to 0.17 l/g. When the intrinsic viscosity $[\eta]$ is lower than 0.05 l/g, the mechanical strength is insufficient when the resulting copolymer is formed into a shaped article. When the intrinsic viscosity $[\eta]$ is higher than 0.17 l/g, the moldability is often degraded.

Acetalization of an olefin-vinyl alcohol copolymer can be accomplished in a homogeneous system while dissolving the copolymer in a solvent such as water together with an aldehyde and an acid catalyst, especially when the olefin content is low. Further, acetalization can be performed in a heterogeneous system while dipping a powder or pellet of the starting copolymer or a shaped article of the starting copolymer, such as a film, a sheet, a tube, a bottle, a pouch or other vessel, in an acetalizing bath. The latter acetalizing method is preferred.

The olefin-vinyl alcohol copolymer may be shaped according to known means. For example, the copolymer can be shaped by melting the copolymer and extruding the melt at a temperature of 180° to 300° C. Formation of a film or the like can be performed according to a ordinary T-die method or inflation film-forming method, and bottles of other vessels can be prepared by extruding the copolymer in the form of a parison by using a die of the cross-head type or spider type and blow-molding the parison in a split mold. The so shaped olefin-vinyl alcohol may be subjected to a known heat treatment conducted, for example, at 120° to 160° C. for 5 to 60 minutes or to a uniaxial or biaxial stretching treatment prior to the acetalization reaction.

As suitable examples of the monoaldehyde represented by the formula (F), there can be mentioned formaldehyde, acetaldehyde, propionaldehyde, n-butyl aldehyde, isobutyl aldehyde, acrolein, crotonaldehyde and benzaldehyde. Among these monoaldehydes, formaldehyde is especially preferred. As suitable examples of the d aldehyde represented by the formula (C), there can be mentioned glyoxal, malonaldehyde, succinic aldehyde, glutaraldehyde, maleic aldehyde and terephthalaldehyde. Among these dialdehydes, glyoxal is especially preferred.

These aldehydes may be used singly or in the form of a mixture of two or more of them.

In the present invention, when acetalization is carried out by using a monoaldehyde represented by the formula (F), there are formed so-called non-crosslinked vinyl acetal units (A) owing to intramolecular acetalization or so-called crosslinked vinyl acetal units (B) owing to intermolecular acetalization. When a dialdehyde of the formula (G) is used for the acetalization, there are formed so-called non-crosslinked vinyl acetal units (C) owing to intramolecular acetalization or so-called crosslinked vinyl acetal units (D) owing to intermolecular acetalization.

Whether crosslinked vinyl acetal units or noncrosslinked vinyl acetal units are formed is remarkably influenced by such factors as the kind of the aldehyde to be used, the kind of the starting olefin-vinyl alcohol copolymer and acetalization conditions. However, it may be said that when a monoaldehyde is employed, in general, vinyl acetal units composed mainly of non-crosslinked units are formed, and that when a dialdehyde is employed, vinyl acetal units comprising crosslinked units and non-crosslinked units at optional ratios may be prepared.

A copolymer comprising vinyl acetal units (C) and (D), which is formed by carrying out the acetalization by using a dialdehyde represented by the formula (G), is especially preferred for attaining the intended objects of the present invention. More specifically, in case of a copolymer comprising both the acetal units (C) and (D), an especially high hot water resistance can be obtained by introduction of such a small amount of the vinyl acetal units as 2 to 1 mole % based on the total vinyl units, and there is attained an advantage that reduction of the oxygen barrier property by introduction of the acetal units can be maintained at a very low level. In this preferred copolymer, it is preferred that the crosslinked vinyl acetal units (D) be present in an amount of at least 1 mole % based on the sum of the vinyl alcohol units and vinyl acetal units and that the molar ratio of non-crosslinked vinyl acetal units (C)/crosslinked vinyl acetal units (D) be in the range of from 1/0.3 to 1/50, especially from 1/0.5 to 1/30.

The acetalization of the olfin-vinyl alcohol copolymer may be carried out according to any optional known means so far as the above requirements are satisfied. For example, the acetalization can be accomplished by dipping a shaped article of an olefin-vinyl alcohol copolymer in an acetalizing bath formed by dissolving an aldehyde and, if necessary, a catalyst or the like into an appropriate solvent.

Water is most preferred as the solvent. In addition, there may be employed alcohols such as methanol and ethanol, organic acids such as acetic acid and ethers such as tetrahydrofuran and dioxane, and mixtures of these organic polar solvents, especially mixtures of these organic polar solvents with water.

The acetalization rate is not particularly influenced by the aldehyde concentration in the bath. When the aldehyde concentration is too low, however, all the aldehyde in the bath is completely consumed while the reaction advances. Further, even if the aldehyde concentration is especially heightened, no particular effect or advantage can be attained. Therefore, it is ordinarily preferred that the aldehyde concentration in the acetalizing bath be 1 to 15% by weight, especially 3 to 10% by weight.

An acid catalyst is generally used as the catalyst for promoting the acetalization reaction, and inorganic acids such as sulfuric acid and hydrochloric acid are especially effective. The acid concentration in the acetalizing bath has significant influences on not only the reaction speed but also the degree of acetalization in the resulting copolymer. In the present invention, good results are obtained when the above-mentioned acid catalyst is used at a concentration of 5 to 50% by weight, especially 10 to 30% by weight.

When acetalization is conducted on a shaped article of an olefin-vinyl alcohol copolymer, a water-soluble inorganic salt such as sodium sulfate (Glauber salt) can be added to the acetalizing bath so as to prevent swelling of the shaped article, and in this case, the salt concentration in the acetalizing bath is adjusted to 5 to 20% by weight.

The temperature and time required for the acetalization reaction are appropriately decided based on experiments so that the desired degree of acetalization can be attained. In general, it is preferred that the reaction be carried out at a temperature of 0° to 250° C., especially 30° to 90° C. The time necessary for the reaction is varied depending on the composition of the acetalizing bath and the reaction temperature, but it is ordinarily preferred that the reaction be conducted for 1 to 120 minutes, especially 5 to 60 minutes.

The acetalized copolymer may be washed with water and dried according to need, and it may be subjected to a post treatment such as a heat treatment. Thus, the intended product is obtained.

In the present invention, the intended olefin-vinyl alcohol-vinyl acetal copolymer is obtained according to the above-mentioned process. The content of the vinyl acetal units in the so formed copolymer can be determined according to the method for measuring the degree of acetalization, which will be described hereinafter. The fact that the copolymer of the present invention includes any of the foregoing vinyl acetal units (A) to (D) is confirmed by the infrared absorption spectrum analysis. More specifically, in the infrared absorption spectrum of the copolymer of the present invention, there is observed a characteristic infrared absorption peak inherent of stretching vibrations of an acetal ring of the formula —O—CH($R_1$)—O— or —O—CH($R_2$)—O— at a wave number of 1000-1030 cm$^{-1}$.

Since the copolymer of the present invention has the above-mentioned specific absorption peak inherent of the above acetal ring, the infrared absorbance ratio (R), determined according to the method described hereinafter, of the copolymer of the present invention is 2.00 to 7.00, especially 2.30 to 6.00, when the monoaldehyde is used for the acetalization, and 1.20 to 2.50, especially 1.30 to 2.00, when the dialdehyde is used for the acetalization.

Uses

The novel copolymer not only can resist hot water or steam maintained at a temperature higher than 100° C., especially higher than 120° C., but also has an excellent oxygen barrier property comparably to that of an untreated ethylene-vinyl alcohol copolymer. Accordingly, the copolymer of the present invention is especially valuable as a packaging material for preserving a food or the like under sealing after heat sterilization conducted according to need.

For example, the copolymer of the present invention can be advantageously used as a sealing film container such as a pouch in the form of a single or a laminate film formed by laminating a film of the copolymer of the present invention on a film of other synthetic resin, a metal foil or a paper for packaging a food, a medicine, a cosmetic material or the like.

A sheet or thick film composed of the copolymer of the present invention or a laminate including the copolymer of the present invention may be molded according to known plastic processing means such as vacuum molding, air-pressure forming, sheet blow molding, draw forming, draw-ironing forming, compression molding, forward extrusion, backward extrusion, forward-backward extrusion and explosion forming, and it may be advantageously used in the form of a cup or other seamless bottomed vessel.

Still further, a parison composed of the copolymer of the present invention or a laminate including the copolymer of the present invention may be blow-molded or draw-blow-molded according to known means, and the copolymer of the present invention may be advantageously used as a packaging vessel in the form of a hollow bottle, a tank or a tube.

Laminate Structure

In accordance with one of most important embodiments of the present invention, there is obtained a laminate structure having excellent hot water resistance, excellent oxygen gas barrier property and high interlaminar peel strength in combination by laminating the above-mentioned olefin-vinyl alcohol-vinyl acetal copolymer with a heat-sealable resin. The fact that this desirable combination of the above-mentioned three properties can be obtained only when the copolymer of the present invention is used will readily be understood from experimental data shown in Table 2 given hereinafter.

The laminate structure of the present invention may have an optional layer arrangement, for example, a two-layer arrangement, a three-layer arrangement or a multi-layer arrangement of four or more layers, so far as it includes (1) a layer of the above-mentioned olefin-vinyl alcohol-vinyl acetal copolymer (often referred to as "vinyl acetal copolymer") and (ii) a heat-sealable resin.

Figure 1:
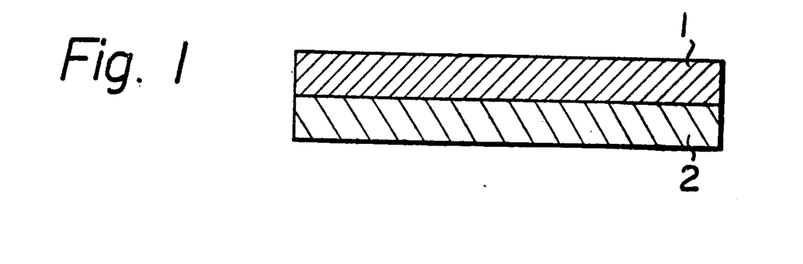
FIG. 1 is a sectional view of a laminate structure of the present invention having two layers.

For example, the laminate structure of the present invention may be a two-layer structure including a layer 1 composed of the vinyl acetal copolymer and a layer 2 composed of the heat-sealable resin as shown in FIG. 1.

Figure 2:
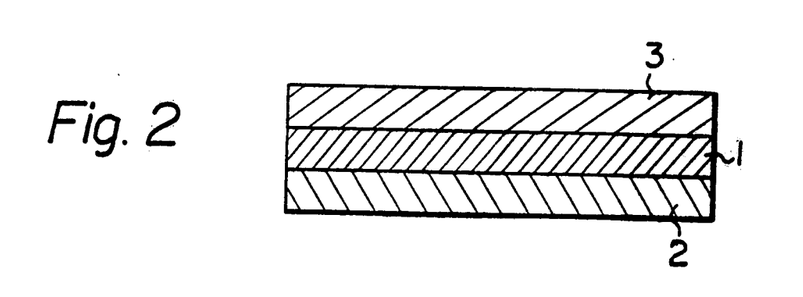
FIG. 2 is a sectional view of a laminate structure of the present invention having three layers.

Further, the laminate structure of the present invention may be a three-layer structure including, as shown in FIG. 2, an intermediate layer 1 composed of the vinyl acetal copolymer, a first outer layer 2 of the heat-sealable resin disposed on one side of the intermediate layer 1 and a second outer layer 3 of a heat-resistant resin disposed on the other side of the intermediate layer 1.

Figure 3:
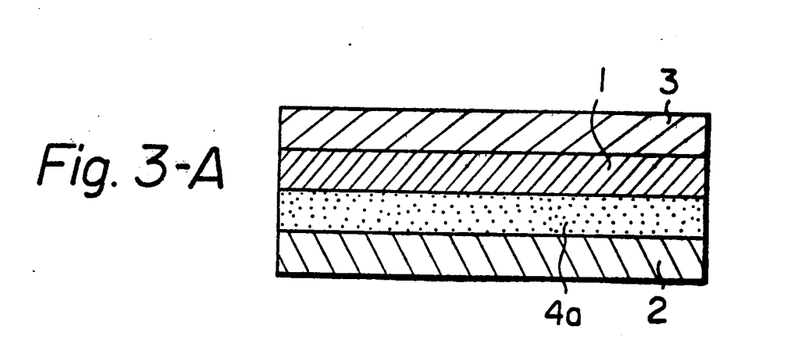

Still further, if desired, the laminate structure of the present may be a four-layer structure including, as shown in FIG. 3-(A), the above-mentioned three layers shown in FIG. 2 and other resin layer 4a, for example, a shock-absorbing layer interposed between the vinyl acetal copolymer layer 1 and the heat-sealable resin layer 2. Alternately, the laminate structure of the present invention may be a four-layer structure including, as shown in FIG. 3-(B), the above-mentioned three layers shown in FIG. 2 and other layer 4b, for example, a shock-absorbing layer or printing ink barrier layer interposed between the vinyl acetal copolymer layer 1 and the heat-resistant resin layer 3.

In each case, the respective resin layers may be bonded together through an adhesive layer (not shown) described hereinafter or they may be bonded directly without using an adhesive layer by fusion bonding under heating or similar means.

In the present invention, in order to impart the heat sealability to the final laminate structure, it is important to use a heat-sealable resin layer in combination with a layer of the above-mentioned vinyl acetal copolymer.

Any of resins that can be molten and become sealable under heating can be used as the heat-sealable resin in the present invention. For example, there can be used polyolefins such as low density polyethylene, medium density polyethylene, high density polyethylene, polypropylene, polybutene-1, poly-4-methylpentene-1, ethylene-vinyl acetate copolymers and mixtures thereof, polyamides such as nylon-11 and nylon-12, and polyester-ethers.

A suitable heat-sealable resin is selected among these polymers, especially polyolefins, according to the heat sterilization treatment conditions to be adopted. For example, when the final product is subjected to a heat sterilization treatment conducted at a temperature lower than 130° C., medium density or high density polyethylene can be used, and when the heat sterilization treatment is carried out at a temperature lower than 100° C., low density polyethylene can be used. Further, when the heat sterilization treatment is conducted at a high temperature of at least 130° C., an unstretched polypropylene film (case polypropylene film) or a film of poly-4-methylpentene-1 can be advantageously used. Still further, modified polypropylene obtained by block-, random- or graft-copolymerizing propylene with other olefin such as ethylene or butene-1 in an amount of up to 15 mole % based on propylene and a blend of polypropylene with other polyolefin such as high density polyethylene in an amount of up to 10% by weight can be used so far as the steric regularity of polypropylene is not lost.

When the openability by peeling is required for the heat-sealed interface of the laminate structure, it is possible to incorporate into the above-mentioned crystalline polyolefin 2 to 30% by weight of an elastomer such as an ethylene-propylene rubber, an ethylene-propylene-non-conjugated diene rubber, a styrene-butadiene rubber, a butadiene rubber, polyisoprene or a butyl rubber according to the known recipe.

In case of a three-layer laminate structure as shown in FIG. 2, as the heat-resistant resin layer, there is employed a layer of an optional resin having a melting or softening point higher than that of the heat-sealable resin. For example, there are preferably employed polyesters, polycarbonates and cellulose esters.

As the polyester, there can be used polyesters consisting of recurring units represented by the following formula:

wherein $R_4$ stands for an alkylene or cycloalkylene group having 2 to 8 carbon atoms and $R_5$ stands for an alkylene or arylene group having 2 to 24 carbon atoms. For example, there are employed polyethylene adipate, polyethylene sebacate, polyethylene terephthalate, polytetramethylene isophthalate, polyethylene terephthalate/isophthalate and poly-1,4-cyclohexylenedimethylene terephthalate.

As the polycarbonate, there can be used polycarbonates having recurring units represented by the following formula:

wherein $R_6$ stands for a hydrocarbon group having 8 to 15 carbon atoms. For example, there can be used poly-p-xylene-glycol biscarbonate, polydihydroxydiphenylmethane carbonate, polydihydroxyphenylethane carbonate, polydihydroxydiphenyl-2,2-propane carbonate and polydihydroxydiphenyl-1,1-ethane carbonate.

As the cellulose ester, there can be used various acetyl celluloses differing in the degree of acetylation.

When a polyolefin is used as the heat-sealable resin, as the heat-resistant resin there can be used polyamides having a melting point higher than the melting point of the polyolefin, especially polyamides consisting of recurring units represented by the following formula:

wherein n is a number of from 3 to 13 and m is a number of from 4 to 11. For example, there can be used poly-ω-aminocaproic acid, poly-ω-aminoheptanoic acid, poly-ω-aminocaprylic acid, poly-ω-aminopelargonic acid, poly-ω-aminoundecanoic acid, poly-ω-aminododecanoic acid, poly-ω-aminotridecanoic acid, polyhexamethylene adipamide, polyhexamethylene sebacamide, polyhexamethylene dodecamide, polyhexamethylene tridecamide, polydecamethylene adipamide, polydecamethylenesebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydecamethylene azelamide, polydodecamethylene azelamide and polytridecamethylene azelamide.

Furthermore, when polyethylene is used as the heat-sealable resin, a biaxially stretched polypropylene film can be used as the heat-resistant resin layer.

As the shock-absorbing layer that is used for a laminate structure including 4 or more layers as shown in FIG. 3-(A) or 3-(B), there is employed a film of a resin having a shock absorption coefficient $K_I$ of at least $0.5 \times 10^{-4}$ cm, especially at least $1.0 \times 10^{-4}$ cm, as determined according to the method described below.

The shock absorption coefficient referred to in the instant specification is determined according to the following method.

A sample resin film is subjected to the retort treatment at 135° C. for 10 minutes, and the retorted sample is pulled at a rate of 200 m/min in both the machine direction and a direction rectangular thereto at room temperature. The load S under 30% stretching of the sample film is determined in the unit of Kg/cm of the film width. Then, the film retorted under the same conditions as described above is pulled at the same temperature and pulling speed in the same directions as described above, and the tensile modulus E (in the unit of Kg/cm²) is determined. With respect to each of the machine direction and the direction rectangular thereto, the tensile load (S) is divided by the tensile modulus (E). Of the so obtained two values, the smaller value is defined as the shock absorption coefficient ($K_I$, the unit being cm).

When polypropylene or poly-4-methylpentene-1 is used as the heat-sealable resin, this shock absorbing layer is especially valuable and effective for improving the resistance to falling shock and other mechanical properties of a packaged container which has been subjected to the retort sterilization. A resin having a $K_I$ value in the above-mentioned range is selected from the above-mentioned polyamides, polycarbonates and polyesters and is used as the shock absorbing layer-constituting resin. A preferred shock absorbing layer is a polyamide film, especially a biaxially stretched film of polycaprolactam. Still further, as the shock absorbing layer-constituting resin there may be used polyester-ethers, especially those consisting of recurring units represented by the following formula:

(M)

wherein $R_7$ stands for a phenylene group, n is a number of from 2 to 4, m is a number of from 2 to 5, l is a number of at least 2, preferably a number of from 6 to 10, and each of p and q is a number of at least 2. As examples of the polyester-ether having the above recurring units, there can be mentioned polyoxyethylene-ethylene terephthalate, poly-1,4-oxybutylene-1,4-butylene terephthalate, and poly-1,4-oxybutylene-ethylene terephthalate.

As the resin constituting a printing ink barrier layer in the laminate structure as shown in FIG. 3-(A) or 3-(B), there may be used, for example, polyamides and polyesters.

In formation of the laminate structure of the present invention, the above-mentioned vinyl acetal copolymer layer and heat-sealable resin layer optionally with the heat-resistant resin layer, shock abosrbing layer and printing ink barrier layer may be laminated according to known laminating means such as dry lamination, extrusion coating, extrusion lamination and coextrusion.

For example, a film of the vinyl acetal copolymer and a film of the heat-sealable resin are prepared in advance, and they are bonded together by a known adhesive such as an isocyanate type adhesive, an epoxy type adhesive or an isocyanate-epoxy type adhesive to form a laminate structure. In case of a three-layer structure as shown in FIG. 2, a film of the heat-resistant resin is bonded to the other side of the vinyl acetal copolymer film, namely on the side opposite to the side to which the heat-sealable resin layer is bonded, according to the above-mentioned bonding means. Further, a four-layer structure as shown in FIG. 3-(A) or 3-(B) may be formed by similar means.

A film of the vinyl acetal copolymer is prepared in advance, and the heat-sealable resin optionally with the heat-resistant resin is extruded in the form of a layer on one or both of the surfaces of the film and fusion-bonded thereto to form a laminate structure In this case, in order to improve the bondability between the two resins, the surface of the vinyl acetal film may be treated in advance with an anchoring agent such as a titanic acid ester or an isocyanate compound according to known procedures.

A film of the vinyl acetal copolymer and a film of the heat-resistant resin or heat-sealable resin are prepared in advance, and the shock abosrbing layer-constituting resin, which also acts as an adhesive, for example, a polyamide or polyester-ether, is extruded between the two resin films to bond the two films and form a laminate structure.

Still further, a laminate structure can be directly formed by coextruding the vinyl acetal copolymer and heat-sealable resin optionally with the heat-resistant resin through a multi-ply die.

In the laminate structure of the present invention, sufficient oxygen barrier property is attained if the thickness of the vinyl acetal copolymer layer is 0.005 to 0.1 mm, especially 0.01 to 0.03 mm, though the preferred thickness is varied to some extent depending on the intended use or the layer structure or arrangement. Further, if the thickness of the heat-sealable resin is 0.01 to 0.1 mm. especially 0.03 to 0.07 mm, satisfactory heat sealability is attained. It is preferred that the thickness of the heat-resistant resin layer and the thickness of shock absorbing layer be 0.005 to 0.03 mm and 0.01 to 0.03 mm, respectively.

When the laminate structure of the present invention is shaped into a container having the heat-sealable resin layer located on the inside and the vinyl acetal copolymer layer or heat-resistant layer located on the outside, the resulting container can be advantageously used as a heat-sealable container. For example, in case of a filmy laminate structure having an entire thickness of 0.04 to 0.15 mm, especially 0.06 to 0.10 mm, a bag-like container or pouch can be formed by piling two of such films and heat-sealing the peripheral portions of the films. Still further, a sheet-like laminate structure having an entire thickness of 0.1 to 5 mm, especially 0.2 to 2 mm, may be formed into a flanged cup container by vacuum forming, air pressure forming, compression molding, draw forming or the like.

The present invention will now be described in detail by reference to the following Examples that by no means limit the scope of the invention.

In these Examples, the degree of acetalization and infrared absorbance ratio were determined according to the following methods.

(1) Degree of Acetalization (1-A) Product Acetalized with Monoaldehyde

The acetalized product is decomposed by sulfuric acid and the monoaldehyde is distilled and trapped by steam distillation. The quantitative analysis of the trapped monoaldehyde is carried out according to the sodium sulfite method, and the degree of acetalization is determined based on the results of the quantitative analysis. The analysis procedures are as follows:

About 1 g (1 g after absolute drying) of the acetalized product sample is decomposed in 100 cc of a 25% aqueous solution of sulfuric acid, and steam distillation is conducted to collect a free aldehyde. When the distillate is acidic, the distillate is carefully neutralized by titration using a normal solution of sodium hydroxide. Then, 50 cc of an aqueous solution containing pure sodium sulfite at a concentration of 1 mole per liter and 3 drops of a 0.1% alcohol solution of thymolphthalein as an indicator are charged in an Erlenmeyer flask having a capacity of 500 cc and neutralization is carefully carried out with a normal solution of sulfuric acid until the blue color of the indicator disappears. The sample solution recovered by distillation trapping and neutralization is added to th charge of the Erlenmeyer flask, and the mixture is titered with 0.1 N sulfuric acid until the mixture is completely decolored. The amount (p, cc) of the sulfuric acid required for the titration is measured.

The total mole number (a) of the units (A) represented by the following formula:

and the units (B) represented by the following formula:

contained in 1 g of the sample is calculated according to the following equation:

$$a = \frac{p}{l \times 10 \times 1000}$$

Supposed that the molecular weight of the monoaldehyde is M and the ethylene content of the saponified ethylene-vinyl acetate copolymer is u mole %, the mole number v of the vinyl groups in 1 g of the sample is given by the following formula:

$$v = \frac{1 - (M + 0.32u - 18.016)a}{44.053 - 0.16u}$$

Accordingly, the acetalization degree A is calculated according to the following formula:

$$A = \frac{2a}{v} \times 100$$

(1-B) Product Acetalized with Dialdehyde

The product acetalized with a dialdehyde includes the units (C) represented by the following formula:

and the units (D) represented by the following formula:

In general, hydroxylamine reacts with a free aldehyde group at room temperature and it reacts with all the aldehyde groups under boiling. Therefore, both the structures (C) and (D) are separated and quantitatively determined by the hydroxylamine hydrochloride method according to the following procedures.

About 1 g (m g after absolute drying) of the sample and 50 cc of a 1 N aqueous solution of hydroxylamine hydrochloride are charged in an Erlenmeyer flask having a capacity of 500 cc, and the charge is allowed to stand still at room temperature a whole day and night to effect reaction. Then, the mixture is filtered, and Bromophenol Blue is added to the filtrate and the mixture is titered with a 0.1 N aqueous solution of sodium hydroxide. The difference q (cc) of the amount of the solution required for titration between this test and the blank test is determined. The mole number b of the units (C) in 1 g of the sample is given by the following formula:

$$b = \frac{q}{m \times 10 \times 1000}$$

Then, about 1 g (n g after absolute drying) of the sample, 50 cc of a 1 N aqueous solution of hydroxylamine hydrochloride and 50 cc of butanol are charged in another Erlenmeyer flask having a capacity of 500 cc, and the mixture is heated under reflux for 3 hours. After the reaction, the mixture is filtered and Bromophenol Blue is added as an indicator to the filtrate. Titration is carried out with a 0.1 N aqueous solution of sodium hydroxide, and the difference r (cc) of the amount of the solution required for titration between this test and the blank test is determined. The mole number d of the units (D) in 1 g of the sample is given by the following formula:

$$d = \frac{r}{n \times 10 \times 1000} - 2b$$

Supposed that the molecular weight of the dialdehyde is N and the ethylene content in the saponified ethylenevinyl acetate copolymer is u mole %, the mole number w of the vinyl groups in 1 g of the sample is given by the following formula:

$$w = \frac{1 - (N + 0.32u - 18.016)b - \left(\frac{N}{2} + 0.32u - 18.016\right)d}{44.053 - 0.16u}$$

Accordingly, the degree C of acetalization to the structure (C) is represented by the following formula:

$$C = \frac{2 \cdot b}{w} \times 100$$

and the degree D of acetalization to the structure (D) is represented by the following formula:

$$D = \frac{2 \cdot d}{w} \times 100$$

(2) Infrared Absorbance Ratio

When a saponified ethylene-vinyl acetate copolymer is acetalized, some new absorptions appear in the infrared absorption spectrum of the acetalized product. Most of these new absorptions are owing to vibrations of CH and $CH_2$, and there is also observed an absorption owing to stretching vibrations of the acetal ring —O—CH(R)—O— at a wave number of 1000-1030 $cm^{-1}$. When R is H, this abosrption appears at 1027 $cm^{-1}$ and this absorption is shifted to the short wave length side when R is a heavy group. Accordingly, the absorbance of this absorption band is used as the index of the degree of acetalization and the absorbance ratio R is calculated according to the following equation:

$$R = \frac{D_1}{D_2} = \frac{\log I_1^0/I_1}{\log I_2^0/I_2}$$

wherein $D_1$ stands for the absorbance of the stretching vibration band of the acetal ring and $D_2$ stands for the absorbance of the $CH_2$ band at 850 $cm^{-1}$.

The absorbance $D_2$ is used for correction of the thickness of the film. The intensity of this band is weakened when the degree of acetalization is excessively enhanced. When the degree of the acetalization is within the range specified in the present invention, however, reduction of the intensity of this band is very small.

EXAMPLES 1 to 4

A saponified ethylene-vinyl acetate copolymer having an ethylene content of 25.4 mole %, a degree of saponification of 99.2% and an intrinsic viscosity of 0.13 l/g was molten and extruded into a film having a thickness of 17μ. This film was treated at a treatment temperature of 60° C. for 10 minutes (Example 1) in an aqueous glyoxalizing bath having a sulfuric acid concentration of 12.5% by weight, a sodium sulfate concentration of 12.5% by weight and a glyoxal concentration of 5.0% by weight. The treated film was washed with water and dried. In order to determine the degree of glyoxalization of the treated film, the amount of glyoxal was determined according to the hydroxylamine hydrochloride method. It was found that glyoxal was bonded to the saponified ethylene-vinyl acetate copolymer in either the noncrosslinked form [structure (C)] or the crosslinked form [structure (D)], and that the degree of glyoxalization to the structure (C) was 1.8%, the degree of glyoxalization to the structure (D) was 1.1 mole % and the total glyoxalization degree was 2.9 mole %. When the treated film was subjected to the infrared absorption spectrum analysis, it was found that the shoulder owing to the acetal ring appeared at 1025 $cm^{-1}$ and the absorbance ratio ($R = D_{1025}/D_{850}$) of this band was 1.31, which value was higher than the value of the absorbance ratio of 1.15 of the unacetalized product (Comparative Example 1). The so obtained treated film was colorless and transparent, and when the oxygen gas permeability of the film was measured, it was found that the film had an oxygen gas permeability of 1.2 cc/m² per 24 hours (as measured at a temperature of 27° C. and a relative humidity of 60%). When this film was treated for 2 hours in boiling water at 100° C., neither blanching nor dissolution was caused and it was confirmed that the film had a good resistance to hot water. When this film was then subjected to the retort treatment at 135° C. for 10 minutes, neither blanching nor dissolution was caused.

Treated films were prepared in the same manner as described above except that the time for the treatment in the glyoxalizing bath was changed (Examples 2 to 4). Treatment conditions and obtained results are collectively shown in Table 1 together with the treatment conditions and obtained results of Example 1.

Comparative Example 1

A saponified ethylene-vinyl acetate copolymer having an ethylene content of 25.4 mole %, a degree of saponification of 99.2% and an intrinsic viscosity of 0.13 l/g was molten and extruded into a film having a thickness of 17μ. In the same manner as described in Example 1, the film was dipped in boiling water at 100° C. except that the film was not subjected to the acetalization treatment. The film was whitened and was in the semi-dissolved state, and the film was converted to a mass because of autohesion.

Comparative Example 2

A saponified ethylene-vinyl acetate copolymer having an ethylene content of 25.4 mole %, a degree of saponification of 99.2% and an intrinsic viscosity of 0.13 l/g was molten and extruded into a film having a thickness of 17μ. The film was treated for 5 minutes in the same glyoxalizing bath as used in Examples 1 to 4, and the treated film was washed with water and dried. When the degree of glyoxalation was determined according to the hydroxylamine hydrochloride method, it was found that the degree of glyoxalation to the non-crosslinked type [structure (C)] was 0.2 mole %, the degree of glyoxalation to the crosslinked type [structure (D)] was 0.1 mole % and the total glyoxalation degree was 0.3 mole %. When the treated film was dipped in boiling water at 100° C., the film was whitened and simultaneously, extreme deformation took place. Accordingly, it was confirmed that the hot water resistance of this treated film was insufficient.

Comparative Example 3

A saponified ethylene-vinyl acetate copolymer having an ethylene content of 25.4 mole %, a degree of saponification of 99.2% and an intrinsic viscosity of 0.13 l/g was molten and extruded into a film having a thickness of 17μ. The resulting film was treated for 90 minutes in the same glyoxalizing bath as used in Examples 1 to 4, and the treated film was washed with water and dried. When the degree of glyoxalation of the so obtained treated film was determined according to the hydroxylamine hydrochloride method, it was found that the degree of glyoxalation to the non-crosslinked type [structure (C)] was 26.8 mole %, the degree of glyoxalation to the crosslinked type [structure (D)] was 29.6 mole % and the total glyoxalation degree was 56.4 mole %. The oxygen gas permeability of the resulting acetalized film was very high and the film was brittle.

Accordingly, this film was not suitable as a packaging material.

Results obtained in Comparative Examples 1 to 3 are collectively shown in Table 1.

EXAMPLE 5

A saponified ethylene-vinyl acetate copolymer having an ethylene content of 25.4 mole %, a degree of saponification of 99.2% and an intrinsic viscosity of 0.13 l/g was molten and extruded into a film having a thickness of 17μ. The film was treated at a treatment temperature of 60° C. for 15 minutes in an aqueous glyoxalizing bath having a hydrochloric acid concentration of 15.0% by weight and a glyoxal concentration of 5.0% by weight. The treated film was washed with water and dried. When the amount of glyoxal was determined according to the hydroxylamine hydrochloride method so as to determine the degree of glyoxalation of the resulting film, it was found that glyoxal was bonded to the saponified ethylene-vinyl acetate copolymer in both the non-crosslinked form [structure (C)] and the crosslinked form [structure (D)], and that the degree of glyoxalation to the structure (C) was 3.1 mole % and the degree of glyoxalation to the structure (D) was 2.6 mole %. When the film was subjected to the infrared absorption spectrum analysis, it was found that the shoulder owing to the acetal ring appeared at 1025 cm$^{-1}$ and the absorbance ratio R ($D_{1025}/D_{850}$) was 1.52. This treated film was colorless and transparent, and when the oxygen gas permeability was measured, it was found that the film had an oxygen gas permeability of 2.4 cc/m$^2$ per 24 hours as measured at a temperature of 27° C. and a relative humidity of 0%. When the so treated film was dipped in boiling water at 100° C. for 2 hours, neither blanching nor dissolution was caused, and it was confirmed that the film had a good resistance to water. When the treated film was subjected to the retort treatment at 135° C. for 10 minutes, neither blanching nor dissolution was caused. Obtained results are shown in Table 1.

EXAMPLES 6 to 8

A saponified ethylene-vinyl acetate copolymer having an ethylene content of 25.4 mole %, a degree of saponification of 99.2% and an intrinsic viscosity of 0.13 l/g was molten and extruded into a film having a thickness of 17μ. The resulting film was treated at a treatment temperature of 60° C. for 5 minutes (Example 6) in an aqueous formalizing bath having a sulfuric acid concentration of 12.5% by weight, a sodium sulfate concentration of 12.5% by weight and a formaldehyde concentration of 4.6% by weight. The treated film was washed with water and dried. When the so obtained film was decomposed by sulfuric acid and subjected to steam distillation, formaldehyde was detected in the distillate. When the distillate was collected and the degree of formalization was determined by quantitative analysis of formaldehyde according to the sodium sulfate method, it was found that the degree of formalization of the treated film was 18.4 mole %. When the treated film was subjected to the infrared absorption spectrum analysis, it was found that an absorption band owing to the acetal ring —O—CH$_2$—O— appeared at 1027 cm$^{-1}$ and that the absorbance ratio R ($D_{1027}/D_{850}$) of this band was 3.76, which was higher than the absorbance ratio value of 1.15 of the untreated film (Comparative Example 1). The treated film was colorless and transparent and the oxygen gas permeability of the treated film was found to be 2.3 cc/m$^2$ per 24 hours as measured at a temperature of 27° C. and a relative humidity of 0%. When this treated film was dipped in boiling water at 100° C. for 2 hours, neither blanching nor dissolution was caused, and it was confirmed that the film had a good resistance to hot water. When the treated film was subjected to the retort treatment at 135° C. for 10 minutes, neither blanching or dissolution was caused.

The foregoing procedures were repeated in the same manner except that the time for the treatment in the formalizing bath was changed (Examples 7 and 8). Treatment conditions and obtained results are shown in Table 1 together with those of Example 6.

EXAMPLES 9 and 10

A saponified ethylene-vinyl acetate copolymer having an ethylene content of 25.4 mole %, a degree of saponification of 99.2% and an intrinsic viscosity of 0.13 l/g was molten and extruded into a film having a thickness of 17μ. The resulting film was treated at 50° C. for 30 minutes (Example 9) in an aqueous formalizing bath having a sulfuric acid concentration of 4.8% by weight, a sodium sulfate concentration of 9.5% by weight and a formaldehyde concentration of 5.3% by weight. The treated film was washed with water and dried. When the resulting sample was decomposed by sulfuric acid and subjected to steam distillation, formaldehyde was detected in the distillate. When the distillate was collected and the degree of formalization was determined by quantitative analysis of formaldehyde in the distilate according to the sodium sulfite method, it was found that the degree of formalization was 8.8 mole %. When the treated film was subjected to the infrared absorption spectrum analysis, it was found that a band owing to the acetal ring —O—CH$_2$—O— appeared at 1027 cm$^{-1}$ and the absorbance ratio R ($D_{1027}/D_{850}$) of this band was 2.43. The treated film was colorless and transparent, and the oxygen gas permeability of this film was found to be 0.5 cc/m$^2$ per 24 hours as measured at a temperature of 27° C. and a relative humidity of 0%. When this film was treated in boiling water at 100° C. for 2 hours, neither blanching nor dissolution was caused. When the film was subjected to the retort treatment at 135° C. for 10 minutes, neither blanching nor dissolution took place.

The above procedures were repeated in the same manner except that the time for the treatment in the formalizing bath was changed to 60 minutes (Example 10). Treatment conditions and obtained results are shown in Table 1 together with those of Example 9.

Comparative Example 4

The same saponified ethylene-vinyl acetate copolymer film as used in Examples 6 to 8 was treated at 60° C. for 45 minutes in the same formalizing bath as used in Examples 6 to 8, and the treated film was washed with water and dried. When the degree of formalization of the resulting film was determined according to the sodium sulfite method, it was found that the degree of formalization was 58.2 mole %. The oxygen gas permeability of the film was found to be as high as 152 cc/m$^2$ per 24 hours as measured at a temperature of 27° C. and a relative humidity of 0%.

Comparative Example 5

The same saponified ethylene-vinyl acetate copolymer film as used in Examples 9 and 10 was treated at 50°

C. for 10 minutes in the same formalizing bath as used in Examples 9 and 10, and the treated film was washed with water and dried. When the degree of formalization of the film was determined according to the sodium sulfite method, it was found that the degree of formalization was 0.4 mole %. When the resulting film was dipped in boiling water at 100° C., the film was whitened and extreme deformation took place. Accordingly, it was confirmed that the hot water resistance of the film was insufficient.

Results obtained in Comparative Examples 4 and 5 are shown in Table 1.

EXAMPLES 11 and 12

A saponified ethylene-vinyl acetate copolymer having an ethylene content of 25.4 mole %, a degree of saponification of 99.2% and an intrinsic viscosity of 0.13 l/g was molten and extruded into a film having a thickness of 17μ. This film was treated at a treatment temperature of 40° C. for 5 minutes (Example 11) in an aqueous acetalizing bath having a sulfuric acid concentration of 5.0% by weight, a sodium sulfate concentration of 8.3% by weight and a glutaraldehyde concentration of 5.5% by weight. The treated film was washed with water and dried. In order to determine the degree of acetalization of the treated film by glutaraldehyde, the amount of glutaraldehyde was determined according to the hydroxylamine hydrochloride method. It was found that glutaraldehyde was bonded to the saponified ethylene-vinyl acetate copolymer in either the non-crosslinked from [structure (C)] or the crosslinked form [structure (D)] though the lather form was predominant, and that the degree of acetalization to the structure (C) was 0.3%, the degree of acetalization to the structure (D) was 3.5 mole % and the total acetalization degree was 3.8 mole %. When the treated film was subjected to the infrared absorption spectrum analysis it was found that the shoulder owing to the acetal ring appeared at 1025 $cm^{-1}$ and the absorbance ratio ($R = D_{1025}/D_{850}$) of this band was 1.30, which value was higher than the value of the absorbance ratio of 1.15 of the unacetalized product (Comparative Example 1). The so obtained treated film was colorless and transparent, and when the oxygen gas permeability of the film was measured, it was found that the film had an oxygen gas permeability of 0.7 cc/$m^2$ per 24 hours (as measured at a temperature of 27° C. and a relative humidity of 0%). When this film was treated for 2 hours in boiling water at 100° C., neither blanching nor dissolution was caused and it was confirmed that the film had a good resistance to hot water. When this film was then subjected to the retort treatment at 135° C. for 10 minutes, neither blanching nor dissolution was caused.

A treated film was prepared in the same manner as described above except that the time for the treatment in the acetalizing bath was changed to 10 minutes (Example 12). Treatment conditions and obtained results are collectively shown in Table 1 together with the treatment conditions and obtained results of Example 11.

Comparative Example 6

A film having a thickness of 17μ, which was prepared from an aqueous solution of a polyvinyl alcohol having a viscosity average degree of polymerization of 1750 and a degree of saponification of 98.5 mole % according to the dry film-forming method, was treated at a treatment temperature of 60° C. for 8 minutes in an aqueous formalizing bath having a sulfuric acid concentration of 15.0% by weight, a sodium sulfate concentration of 15.0% by weight and a formaldehyde concentration of 5.0% by weight, and the treated film was washed with water and dried. When the degree of formalization in the resulting film was determined according to the sodium sulfite method, it was found that the degree of formalization was 22.3 mole %. The oxygen gas permeability of the film was found to be 2.8 cc/$m^2$ per 24 hours as measured at a temperature of 27° C. and a relative humidity of 0%. Accordingly, it was confirmed that the gas barrier property of the film was good. However, when the film was dipped in boiling water at 100° C., deformation was extreme and the film became in the semi-molten state, and it was confirmed that the hot water resistance of the film was very poor. Obtained results are shown in Table 1.

Comparative Example 7

The same polyvinyl alcohol film as used in Comparative Example 6 was treated at 60° C. for 90 minutes in the same formalizing bath as used in Comparative Example 6, and the treated film was washed with water and dried. When the degree of formalization of the resulting film was determined according to the sodium sulfite method, it was found that the degree of formalization was 60.2 mole %. The film was found to be resistant to the dipping treatment in boiling water at 100° C., but the oxygen gas permeability of the film was found to be as high as 63.0 cc/$m^2$ per 24 hours as measured at a temperature of 27° C. and a relative humidity of 0% and it was confirmed that the oxygen barrier property of the film was poor. Obtained results are shown in FIG. 1.

Comparative Example 8

The same polyvinyl alcohol film as used in Comparative Example 6 was treated at 60° C. for 60 minutes in an aqueous glyoxalizing bath having a sulfuric acid concentration of 15.0% by weight, a sodium sulfite concentration of 15.0% by weight and a glyoxal concentration of 5.0% by weight, and the treated film was washed with water and dried. When the degree of glyoxalization was determined according to the hydroxylamine hydrochloride method, it was found that the degree of glyoxalization to the non-crosslinked structure was 11.4 mole %, the degree of glyoxalization to the crosslinked structure was 6.1 mole % and the total glyoxalization degree was 17.8 mole %. The oxygen gas permeability of the treated film was found to be as high as 47.5 cc/$m^2$ per 24 hours as measured at a temperature of 27° C. and a relative humidity of 0%, and it was confirmed that the oxygen barrier property of the film was poor. When the film was dipped in boiling water at 100° C., deformation was extreme. As a result, it was confirmed that even when the acetalization is sufficiently advanced, if there are not present olefin units, no sufficient hot water resistance can be obtained. Results obtained in this Comparative Example are shown in Table 1.

TABLE 1

| | Acetalizing Bath | | Reaction Conditions |
| --- | --- | --- | --- |
| | | Concentra- | |

TABLE 1-continued

|  | Aldehyde | | Acid | | tion of Sodium Sulfate (wt. %) | Temperature (°C.) | Time (min) | Degree of Acetalization (mole %) | | |
|---|---|---|---|---|---|---|---|---|---|---|
|  | Kind | Concentration (wt. %) | Kind | Concentration (wt. %) |  |  |  | Non-cross-linked | Cross-linked | Total |
| Example 1 | glyoxal | 5.0 | sulfuric acid | 12.5 | 12.5 | 60 | 10 | 1.8 | 1.1 | 2.9 |
| Example 2 | glyoxal | 5.0 | sulfuric acid | 12.5 | 12.5 | 60 | 15 | 2.9 | 1.6 | 4.5 |
| Example 3 | glyoxal | 5.0 | sulfuric acid | 12.5 | 12.5 | 60 | 20 | 4.4 | 2.7 | 7.1 |
| Example 4 | glyoxal | 5.0 | sulfuric acid | 12.5 | 12.5 | 60 | 30 | 4.8 | 2.9 | 7.7 |
| Example 5 | glyoxal | 5.0 | hydrochloric acid | 15.0 | — | 60 | 15 | 3.1 | 2.6 | 5.7 |
| Example 6 | formaldehyde | 4.6 | sulfuric acid | 12.5 | 12.5 | 60 | 5 | 18.4 | — | 18.4 |
| Example 7 | formaldehyde | 4.6 | sulfuric acid | 12.5 | 12.5 | 60 | 10 | 27.8 | — | 27.8 |
| Example 8 | formaldehyde | 4.6 | sulfuric acid | 12.5 | 12.5 | 60 | 15 | 33.9 | — | 33.9 |
| Example 9 | formaldehyde | 5.3 | sulfuric acid | 4.8 | 9.5 | 50 | 30 | 8.8 | — | 8.8 |
| Example 10 | formaldehyde | 5.3 | sulfuric acid | 4.8 | 9.5 | 50 | 60 | 16.2 | — | 16.2 |
| Example 11 | glutaraldehyde | 5.5 | sulfuric acid | 5.0 | 8.3 | 40 | 5 | 0.3 | 3.5 | 3.8 |
| Example 12 | glutaraldehyde | 5.5 | sulfuric acid | 5.0 | 8.3 | 40 | 10 | 0.3 | 6.4 | 6.7 |
| Comparative Example 1 | — | — | — | — | — | — | — | — | — | — |
| Example 2 | glyoxal | 5.0 | sulfuric acid | 12.5 | 12.5 | 60 | 5 | 0.2 | 0.1 | 0.3 |
| Example 3 | glyoxal | 5.0 | sulfuric acid | 12.5 | 12.5 | 60 | 90 | 26.8 | 29.6 | 56.4 |
| Example 4 | formaldehyde | 4.6 | sulfuric acid | 12.5 | 12.5 | 60 | 45 | 58.2 | — | 58.2 |
| Example 5 | formaldehyde | 5.3 | sulfuric acid | 4.8 | 9.5 | 50 | 10 | 0.4 | — | 0.4 |
| Example 6 | formaldehyde | 5.0 | sulfuric acid | 15.0 | 15.0 | 60 | 8 | 22.3 | — | 22.3 |
| Example 7 | formaldehyde | 5.0 | sulfuric acid | 15.0 | 15.0 | 60 | 90 | 60.2 | — | 60.2 |
| Example 8 | glyoxal | 5.0 | sulfuric acid | 15.0 | 15.0 | 60 | 60 | 11.4 | 6.2 | 17.8 |

|  | Infrared Absorbance Ratio R | Oxygen Gas Permeability (cc/m² per 24 hours) | Rupture Stress (kg/cm²) | Hot Water Resistance | | | |
|---|---|---|---|---|---|---|---|
|  |  |  |  | 100° C., 120 min. | | 135° C., 10 min. | |
|  |  |  |  | blanching | dissolution | blanching | dissolution |
| Example 1 | 1.37 | 1.2* | 704 | not | not | not | not |
| Example 2 | 1.37 | 1.3* | 767 | not | not | not | not |
| Example 3 | 1.78 | 1.5* | 838 | not | not | not | not |
| Example 4 | 1.93 | 2.1* | 696 | not | not | not | not |
| Example 5 | 1.52 | 2.4** | 775 | not | not | not | not |
| Example 6 | 3.76 | 2.3** | 782 | not | not | not | not |
| Example 7 | 4.52 | 3.6** | 769 | not | not | not | not |
| Example 8 | 5.28 | 4.7** | 771 | not | not | not | not |
| Example 9 | 2.43 | 0.5** | 753 | not | not | not | not |
| Example 10 | 3.38 | 0.8** | 746 | not | not | not | not |
| Example 11 | 1.30 | 0.7** | 738 | not | not | not | not |
| Example 12 | 1.49 | 0.8** | 723 | not | not | not | not |
| Comparative Example 1 | 1.15 | 1.2* | 701 | observed | observed | observed | observed |
| Example 2 | 1.18 | 1.2* | 769 | observed | not | observed | observed |
| Example 3 | 3.86 | 52.0* | 180 | — | — | — | — |
| Example 4 | 9.65 | 152.0** | 376 | not | not | not | not |
| Example 5 | 1.72 | 1.8** | 773 | observed | not | observed | observed |
| Example 6 | — | 2.8** | — | observed | observed | observed | observed |
| Example 7 | — | 63.0** | — | not | not | not | not |
| Example 8 | — | 47.5** | — | observed | not | observed | observed |

Notes
[1] The oxygen gas permeability was measured according to the equal pressure method using an oxygen electrode.
[2] Oxygen gas permeability measuring conditions:
*: at 27° C. and 60% RH
**: at 27° C. and 0% RH

EXAMPLES 13 to 16

A biaxially stretched polyester film having a thickness of 12μ was bonded to one surface of the treated film obtained in Example 1 by using a urethane type adhesive, and an unstretched polypropylene film having a thickness of 50μ was bonded on the other surface of the treated film obtained in Example 1 by using the same urethane type adhesive. The obtained three-layer laminated film was colorless and transparent and the oxygen gas permeability was found to be 2.4 cc/m² per 24 hours as measured at a temperature of 27° C. and a relative humidity of 0%. When this three-layer laminated film was subjected to the retort treatment at 135° C. for 10 minutes, occurrence of blanching, wrinkling, contraction or interlaminar peeling was not obtained at all. The oxygen gas permeability of the retorted laminated film was found to be 2.1 cc/m² per 24 hours as measured at a temperature of 27° C. and a relative humidity of 0%. Thus, it was confirmed that this three-layer laminated film was very excellent as a packaging material to be subjected to heat sterilization.

In the same manner as described above, a biaxially stretched polyester film having a thickness of 12μ and an unstretched polypropylene film having a thickness of 50μ were bonded to one surface and the other surface, respectively, of each of the treated films differing from the above film of Example 1 in the time for the glyoxalization treatment (namely, the treated films obtained in Examples 2 to 4), and the resulting laminated films were tested in the same manner as described above (Examples 14 to 16). Treatment conditions and obtained results of these Examples are collectively shown in Table 2 together with those of the above-mentioned Example 13.

Comparative Example 9

In the same manner as described in Example 13, a biaxially stretched polyester film having a thickness of 12μ and an unstretched polypropylene film having a thickness of 50μ were laminated of the unacetalized film obtained in Comparative Example 1 by using a urethane type adhesive. When the resulting three-layer laminated film was subjected to the retort treatment, blanching and wrinkling were conspicuous and peeling was observed in the laminated interfaces.

Comparative Example 10

In the same manner as described in Example 13, a biaxially stretched polyester film having a thickness of 12μ and an unsaturated polypropylene film having a thickness of 50μ were laminated on one surface and the other surface, respectively, of the treated film obtained in Comparative Example 2 by using a urethane type adhesive. When the obtained three-layer laminated film was subjected to the retort treatment at 135° C. for 10 minutes, conspicuous blanching was caused. Accordingly, it was confirmed that when the degree of glyoxalization is low, the resulting laminate structure is not suitable as a packaging material to be subjected to heat sterilization.

Comparative Example 11

A three-layer laminated film was obtained by bonding a biaxially stretched polyester film having a thickness of 12μ to one surface of the treated film obtained in Comparative Example 3 and an unstretched polypolylene film having a thickness of 50μ to the other surface of said treated film by using a urethane type adhesive. The oxygen gas permeabiliy of the resulting three-layer laminated film was found to be as high as 73 cc/m$^2$ per 24 hours as measured at a temperature of 27° C. and a relative humidity of 0%. When the three-layer laminated film was subjected to the retort treatment at 135° C. for 10 minutes, cracks were formed in the intermediate layer of the laminated film. Accordingly, it was confirmed that this laminated film was not suitable as a packaging material to be subjected to heat sterilization.

Results obtained in Comparative Examples 9 to 11 are collectively shown in Table 2.

EXAMPLE 17

A biaxially stretched polyester film having a thickness of 12μ and an unstretched polypropylene film having a thickness of 50μ were bonded to one surface and the other surface, respectively, of the treated film obtained in Example 5 by using a urethane type adhesive. The oxygen gas permeability of the so obtained three-layer laminated film was found to be 2.2 cc/m$^2$ per 24 hours as measured at a temperature of 27° C. and a relative humidity of 0%. When this three-layer laminated film was subjected to the retort treatment at 135° C. for 10 minutes, occurrence of blanching, wrinkling, contraction or interlaminar peeling was not observed in the laminated film. The oxygen gas permeability of the retorted laminated film was found to be 2.0 cc/m$^2$ per 24 hours as measured at a temperature of 27° C. and a relative humidity of 0%. Accordingly, it was confirmed that this three-layer laminated film was excellent as a packaging material to be subjected to heat sterilization. Results obtained in this Example are shown in Table 2.

EXAMPLES 18 to 20

A biaxially stretched polyester film having a thickness of 12μ and a film having a thickness of 50μ and being composed of a blend comprising 85% by weight of a poly-4-methylpentene-1 resin having a melting point of 230° C., a specific gravity of 0.84 and a melt index of 25 and 15% by weight of an ethylene-propylene copolymer rubber (EPR) having an average molecular weight of 100,000 and a propylene content of 35 mole % were bonded to one surface and the other surface, respectively, of the treated film obtained in Example 6 by using a urethane type adhesive. The oxygen gas permeability of the so obtained three-layer laminated film was found to be 2.7 cc/m$^2$ per 24 hours as measured at a temperature of 27° C. and a relative humidity of 0%. When this three-layer laminated film was subjected to the retort treatment at 135° C. for 10 minutes, occurrence of blanching, wrinkling, contraction or interlaminar peeling was not observed in the laminated film.

In the same manner as described above, a biaxially stretched polyester film having a thickness of 12μ and an unstretched polypropylene film having a thickness of 50μ were bonded to one surface and the other surface, respectively, of each of the treated films differing from the above treated film in the formalizing treatment time (namely, the treated films obtained in Examples 7 and 8), and the resulting laminated films were tested in the same manner as described above (Examples 19 to 20). Treatment conditions and obtained results of these Examples 19 to 20 are shown in Table 2 together with those of the above-mentioned Example 18.

EXAMPLES 21 and 22

A biaxially stretched nylon-6 film having a thickness of 15μ and a film having a thickness of 50μ and being composed of a blend comprising 95% by weight of a polypropylene having a melting point of 163° C. and a density of 0.90 and 5% by weight of an ethylene-propylene copolymer rubber (EPR) having an average molecular weight of 100,000 and a propylene content of 35 mole % were bonded to one surface and the other surface, respectively, of the treated film obtained in Example 9 by using a urethane type adhesive. The so obtained three-layer laminated film was very tough, and the oxygen gas permeability of this three-layer laminated film was found to be 0.8 cc/m$^2$ per 24 hours as measured at a temperature of 27° C. and a relative humidity of 0%. When this three-layer laminated film was subjected to the retort treatment at 135° C. for 10 minutes, occurrence of blanching, wrinkling, contraction or interlaminar peeling was not observed in the laminated film. Obtained results of this Example 21 are shown in Table 2.

A biaxially stretched polyester film having a thickness of 12μ and an unstretched nylon-12 film having a thickness of 40μ were bonded to one surface and the other surface, respectively, of the treated film obtained in the same manner as in case of the above treated film except that the acetalizing treatment time was changed to 60 minutes (namely, the treated film obtained in Example 10) by using a urethane type adhesive. This three-layer laminated film was tested in the same manner as described above. Treatment conditions and obtained results of this Example 22 are shown in Table 2.

Comparative Example 12

A biaxially stretched polyester film having a thickness of 12μ and an unstretched polypropylene film having a thickness of 50μ were bonded to one surface and the other surface, respectively, of the film obtained in Comparative Example 4 by using a urethane type adhesive. The oxygen gas permeability of the so obtained three-layer laminated film was found to be as high as 148 cc/m² per 24 hours as measured at a temperature of 27° C. and a relative humidity of 0%.

Comparative Example 13

A biaxially stretched polyester film having a thickness of 12μ and an unstretched polypropylene film having a thickness of 50μ were bonded to one surface and the other surface, respectively, of the film obtained in Comparative Example 5 by using a urethane type adhesive. When the so obtained three-layer laminated film was subjected to the retort treatment at 135° C. for 10 minutes, occurrence of conspicuous blanching was observed. Thus, it was confirmed that when the degree of formalization is low, the resulting laminate film structure is not suitable as a packaging material to be subjected to heat sterilization.

Results obtained in Comparative Examples 12 and 13 are shown in Table 2.

EXAMPLES 23 and 24

A biaxially stretched polyester film having a thickness of 12μ and a film having thickness of 50μ and being composed of an ethylene-propylene block copolymer resin having a melting point of 160° C., a density of 0.90 and an ethylene content of 5 mole % were bonded to one surface and the other surface, respectively, of the treated film obtained in Example 11 by using a urethane type adhesive. The oxygen gas permeability of the so obtained three-layer laminated film was found to be 1.2 cc/m² per 24 hours as measured at a temperature of 27° C. and relative humidity of 0%. When this three-layer laminated film was subjected to the retor treatment at 135° C. for 10 minutes, occurence of blanching, wrinkling, contraction or interlaminar peeling was not observed (Example 23).

A biaxially stretched polyester film having a thickness of 12μ and a film having a thickness of 50μ and being composed of an ethylene-propylene block copolymer having a melting point of 160° C., a density of 0.90 and an ethylene content of 5 mole % were bonded to one surface and the other surface, respectively, of the treated film obtained in Example 12 (the acetalization treatment time being 10 minutes) by using a urethane type adhesive. The oxygen gas permeability of the so obtained three-layer laminated film was found to be 1.7 cc/m² per 24 hours as measured at a temperature of 27° C. and a relative humidity of 0%. When this three-layer laminated film was subjected to the retort treatment at 135° C. for 10 minutes, occurrence of blanching, wrinkling, contraction or interlaminar peeling was not observed (Example 24).

Results obtained in Examples 23 and 24 are shown in Table 2.

Comparative Example 14

A biaxially stretched polyester film having a thickness of 12μ and an unstretched polypropylene film having a thickness of 50 μ were bonded to one surface and the other surface, respectively, of the film obtained in Comparative Example 6 by using a urethane type adhesive. The oxygen gas permeability of the resulting three-layer laminated film was found to be 2.9 cc/m² per 24 hours as measured at a temperature of 27° C. and a relative humidity of 0%, and it was confirmed that the oxygen gas barrier property of this laminated film was good. However, when the laminated film was subjected to the retort treatment at 135° C. for 10 minutes, occurrence of conspicuous blanching and interlaminar peeling was observed, and it was confirmed that the adoptability of the laminated film to the retort treatment was poor.

Obtained results are shown in Table 2.

Comparative Example 15

A biaxially stretched polyester film having a thickness of 12μ and an unstretched polypropylene film having a thickness of 50μ wer bonded to one surface and the outer surface, respectively, of the film obtained in Comparative Example 7 by using a urethane type adhesive. When this three-layer laminated film was subjected to the retort treatment at 135° C. for 10 minutes, it was found that the laminated film had a good adaptability to the retort treatment. However, the oxygen gas permeability of the laminated film was found to be as high as 68.5 cc/m² per 24 hours as measured at a temperature of 27° C. and a relative humidity of 0%.

Obtained results are shown in Table 2.

Comparative Example 16

A biaxially stretched polyester film having a thickness of 12μ and an unstretched polypropylene film having a thickness of 50μ were bonded to one surface and the other surface, respectively, of the film obtained in Comparative Example 8 by using a urethane type adhesive. The oxygen gas permeability of the resulting three-layer laminated film was found to be 49.7 cc/m² per 24 hours as measured at a temperature of 27° C. and a relative humidity of 0%, and it was confirmed that the oxygen gas barrier property of this laminated film was poor. When this laminated film was subjected to the retort treatment at 135° C. for 10 minutes, occurrence of blanching and interlaminar peeling was observed. Accordingly, it was confirmed that even when the acetalization is sufficiently advanced, it there are not present olefin units, a sufficient adaptability to the retort treatment cannot be obtained.

Obtained results are shown in Table 2.

TABLE 2

| | Acetalizing Bath | | | | Sodium Sulfate Concentration (wt. %) | Reaction Conditions | | Degree of Acetalization (mole %) | | |
| | Aldehyde | | Acid | | | | | | | |
| | Kind | Concentration (wt. %) | Kind | Concentration (wt. %) | | Temperature (°C.) | Time (min) | noncross-linked | cross-linked | Total |
|---|---|---|---|---|---|---|---|---|---|---|
| Example 13 | glyoxal | 5.0 | sulfuric acid | 12.5 | 12.5 | 60 | 10 | 1.8 | 1.1 | 2.9 |
| Example 14 | glyoxal | 5.0 | sulfuric acid | 12.5 | 12.5 | 60 | 15 | 2.9 | 1.6 | 4.5 |
| Example 15 | glyoxal | 5.0 | sulfuric acid | 12.5 | 12.5 | 60 | 20 | 4.4 | 2.7 | 7.1 |
| Example 16 | glyoxal | 5.0 | sulfuric acid | 12.5 | 12.5 | 60 | 30 | 4.8 | 2.9 | 7.7 |
| Example 17 | glyoxal | 5.0 | hydrochloric acid | 15.0 | — | 60 | 15 | 3.1 | 2.6 | 5.7 |
| Example 18 | formaldehyde | 4.6 | sulfuric acid | 12.5 | 12.5 | 60 | 5 | 18.4 | — | 18.4 |
| Example 19 | formaldehyde | 4.6 | sufluric acid | 12.5 | 12.5 | 60 | 10 | 27.8 | — | 27.8 |
| Example 20 | formaldehyde | 4.6 | sulfuric acid | 12.5 | 12.5 | 60 | 15 | 33.9 | — | 33.9 |

TABLE 2-continued

| | | | | | | | | | | |
|---|---|---|---|---|---|---|---|---|---|---|
| Example 21 | formaldehyde | 5.3 | sulfuric acid | 4.8 | 9.5 | 50 | 30 | 8.8 | — | 8.8 |
| Example 22 | formaldehyde | 5.3 | sulfuric acid | 4.8 | 9.5 | 50 | 60 | 16.2 | — | 16.2 |
| Example 23 | glutaraldehyde | 5.5 | sulfuric acid | 5.0 | 8.3 | 40 | 5 | 0.3 | 3.5 | 3.8 |
| Example 24 | glutaraldehyde | 5.5 | sulfuric acid | 5.0 | 8.3 | 40 | 10 | 0.3 | 6.4 | 6.7 |
| Comparative Example 9 | — | — | — | — | — | — | — | — | — | — |
| Comparative Example 10 | glyoxal | 5.0 | sulfuric acid | 12.5 | 12.5 | 60 | 5 | 0.2 | 0.1 | 0.3 |
| Comparative Example 11 | glyoxal | 5.0 | sulfuric acid | 12.5 | 12.5 | 60 | 90 | 26.8 | 29.6 | 56.4 |
| Comparative Example 12 | formaldehyde | 4.6 | sulfuric acid | 12.5 | 12.5 | 60 | 45 | 58.2 | — | 58.2 |
| Comparative Example 13 | formaldehyde | 5.3 | sulfuric acid | 4.8 | 9.5 | 50 | 10 | 0.4 | — | 0.4 |
| Comparative Example 14 | formaldehyde | 5.0 | sulfuric acid | 15.0 | 15.0 | 60 | 8 | 22.3 | — | 22.3 |
| Comparative Example 15 | formaldehyde | 5.0 | sulfuric acid | 15.0 | 15.0 | 60 | 90 | 60.2 | — | 60.2 |
| Comparative Example 16 | glyoxal | 5.0 | sulfuric acid | 15.0 | 15.0 | 60 | 60 | 11.4 | 6.2 | 17.8 |

| | Infrared Absorbance Ratio R | Layer Laminate Structure | Oxygen Gas Permeability (cc/m² per 24 hours) | | Adaptability to Retorting (135° C., 10 minutes) | | |
|---|---|---|---|---|---|---|---|
| | | | before retorting | after retorting (135° C., 10 minutes) | blanching | wrinkling | peeling |
| Example 13 | 1.31 | 12X17E* 50Q | 2.4 | 2.1 | not | not | not |
| Example 14 | 1.37 | 12X17E* 50Q | 2.6 | 2.8 | not | not | not |
| Example 15 | 1.78 | 12X17E* 50Q | 2.5 | 2.7 | not | not | not |
| Example 16 | 1.95 | 12X17E* 50Q | 3.2 | 3.5 | not | not | not |
| Example 17 | 1.52 | 12X17E* 50Q | 2.2 | 2.0 | not | not | not |
| Example 18 | 3.76 | 12X17E* 50M* | 2.7 | 1.4 | not | not | not |
| Example 19 | 4.52 | 12X17E* 50Q | 3.4 | 4.4 | not | not | not |
| Example 20 | 5.28 | 12X17E* 50Q | 4.3 | 4.4 | not | not | not |
| Example 21 | 2.43 | 15N17E* 50Q | 0.8 | 1.6 | not | not | not |
| Example 22 | 3.38 | 12X17E* 40N' | 2.9 | 2.5 | not | not | not |
| Example 23 | 1.30 | 12X17E* 50Q | 1.2 | 0.8 | not | not | not |
| Example 24 | 1.49 | 12X17E* 50Q | 1.7 | 0.6 | not | not | not |
| Comparative Example 9 | 1.15 | 12X17E 50Q | 1.8 | — | observed | observed | observed |
| Comparative Example 10 | 1.18 | 12X17E* 50Q | 1.9 | — | observed | observed | observed |
| Comparative Example 11 | 3.86 | 12X17E* 50Q | 73.0 | — | — | — | — |
| Comparative Example 12 | 9.65 | 12X17E* 50Q | 148.0 | — | — | — | — |
| Comparative Example 13 | 1.72 | 12X17E* 50Q | 0.7 | — | observed | observed | observed |
| Comparative Example 14 | — | 12X17E* 50Q | 2.9 | — | observed | observed | observed |
| Comparative Example 15 | — | 12X17E* 50Q | 68.5 | 96.3 | not | not | not |
| Comparative Example 16 | — | 12X17E* 50Q | 49.7 | — | observed | observed | observed |

Notes

[1] The oxygen gas permeability was measured at a temperature of 27° C. and a relative humidity of 0% according to the equal pressure method using an oxygen electrode.
[2] Symbols in the layer laminate structure have the following meaning:
12X: polyester film having a thickness of 12 μ
17E: unacetalized saponified ethylene-vinyl acetate copolymer film having a thickness of 17 μ
17E*: acetalized saponified ethylene-vinyl acetate copolymer film having a thickness of 17 μ
50Q: polypropylene film having a thickness of 50 μ
50Q*: polypropylene-EPR blend film having a thickness of 50 μ
50M*: poly-4-methylpentene-1-EPR blend film having a thickness of 50 μ
15N: nylon-6 film having a thickness of 15 μ
40N': nylon-12 film having a thickness of 40 μ.

What is claimed is as my invention:

1. A laminated material having excellent hot water resistance, excellent oxygen barrier property and excellent heat sealability in combination, which comprises (i) a layer composed of an olefin-vinyl alcohol-vinyl acetal copolymer and (ii) a layer composed of a heat-sealable resin, said olefin-vinyl alcohol-vinyl acetal copolymer consisting essentially of 10 to 50 mole % of olefin units and 90 to 50 mole % of vinyl units, 50 to 98 mole % of the vinyl units being vinyl alcohol units and 2 to 50 mole % of the vinyl units being at least one kind of vinyl acetal units selected from the group consisting of (A) units represented by the following formula:

wherein $R_1$ stands for a hydrogen atom or a monovalent aliphatic, aromatic or aliphatic-aromatic group, (B) units represented by the following formula:

wherein $R_1$ is as defined above, (C) units represented by the following formula:

wherein $R_2$ stands for a direct bond or a divalent aliphatic, aromatic or aliphatic-aromatic group, and

(D) units represented by the following formula:

wherein $R_2$ is as defined above.

2. A laminate structure as set forth in claim 1 wherin the olefin units are ethylene units or ethylene units and up to 15 mole %, based on the ethylene units, of propylene units.

3. A laminate structure as set forth in claim 1 wherein said vinyl acetal units are units derived from glyoxal and represented by the following formula (C'):

and/or units derived from glyoxal and represented by the following formula (D'):

4. A laminate structure as set forth in claim 1 or 3 wherein said copolymer consists essentially of 20 to 40 mole % of olefin units and 80 to 60 mole % of vinyl units, 70 to 95 mole % of the vinyl units being vinyl alcohol units and 5 to 30 mole % of the vinyl units being vinyl acetal units.

5. A laminate structure as set forth in claim 1 or 3 wherein the vinyl acetal units (D) are present in an amount of at least 1 mole % of the vinyl units.

6. A laminate structure as set forth in claim 1 or 3 wherein said heat-sealable resin is a polyolefin.

7. A laminate structure as set forth in claim 1 or 3 wherein said heat-sealable resin is an isotatic polypropylene.

8. A laminate structure as set forth in claim 1 wherein the heat-sealable resin layer (ii) is formed on one surface of said olefin-vinyl alcohol-vinyl acetal copolymer layer (i), said heat-sealable resin layer (ii) being composed of a polyolefin, and a heat-resistant resin layer (iii) composed of a resin having a melting or softening point higher than that of said polyolefin is formed on the other surface of said copolymer layer (i).

9. A laminate structure as set forth in claim 8 wherin said heat-resistant resin layer (iii) is composed of a polyester.

10. A laminate structure as set forth in claim 1 wherein other resin layer (iv) is formed between said copolymer layer (i) and said heat-sealable resin layer (ii).

11. A laminate structure as set forth in claim 8 wherein other resin layer (iv) is formed between said copolymer layer (i) and said heat-sealable resin layer or said copolymer layer (i) and said heat-resistant resin layer (iii).

* * * * *